Figure 1:
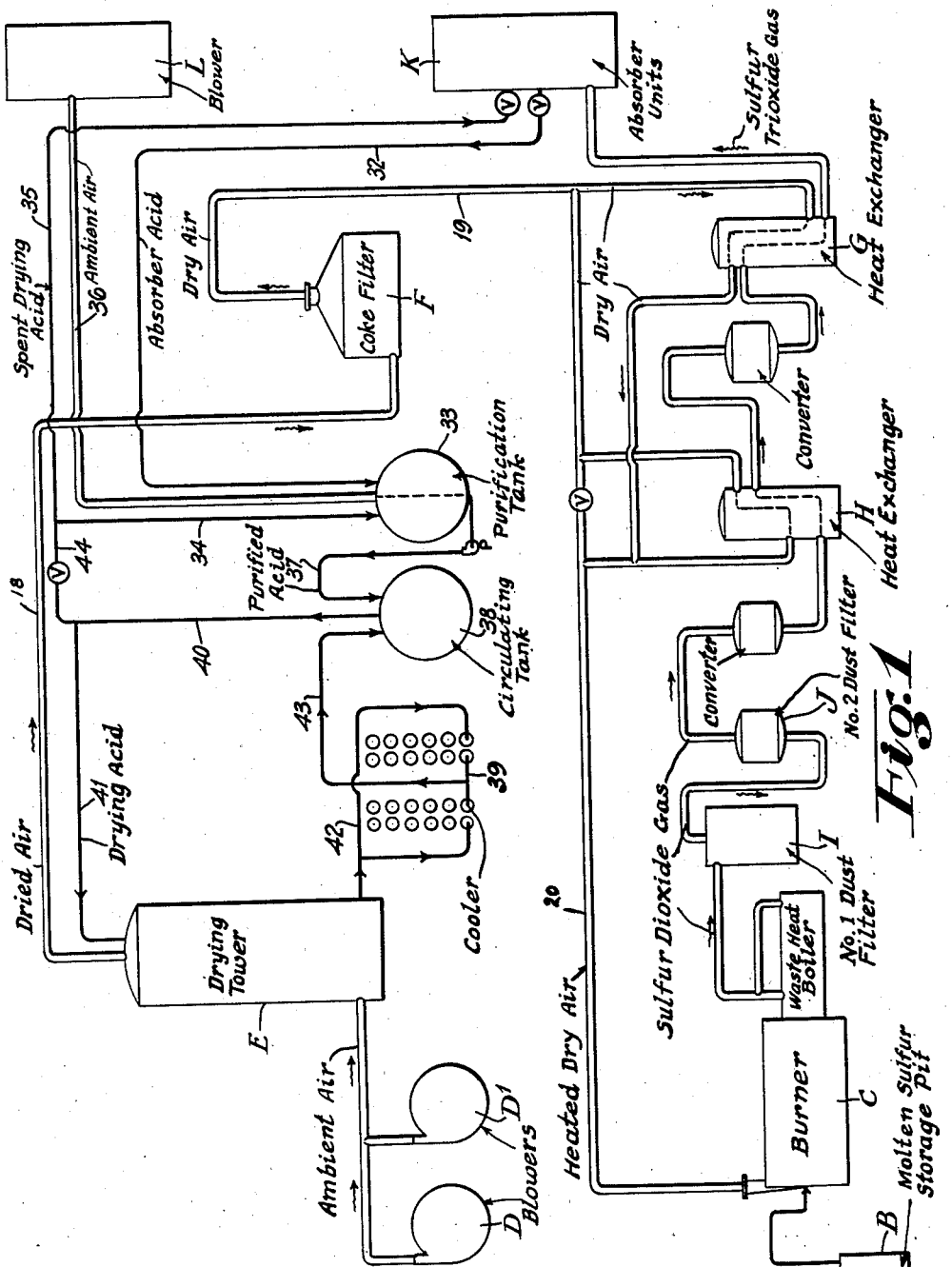

Dec. 21, 1943.  L. S. MUNSON ET AL  2,337,060
MANUFACTURE OF SULPHURIC ACID
Filed April 24, 1940  3 Sheets-Sheet 2

Lewis S. Munson
Herman W. Mahr   INVENTORS
BY
ATTORNEY

Dec. 21, 1943.   L. S. MUNSON ET AL   2,337,060
MANUFACTURE OF SULPHURIC ACID
Filed April 24, 1940   3 Sheets-Sheet 3
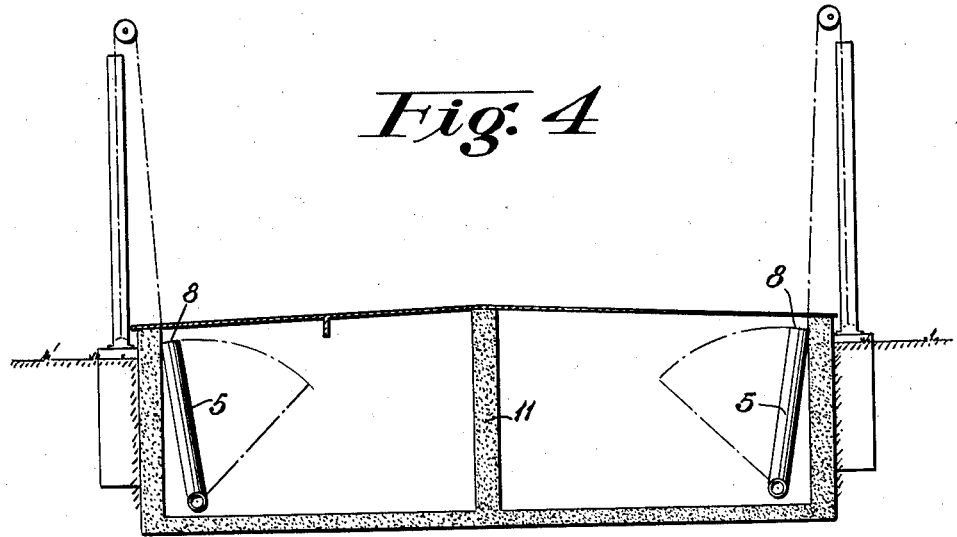
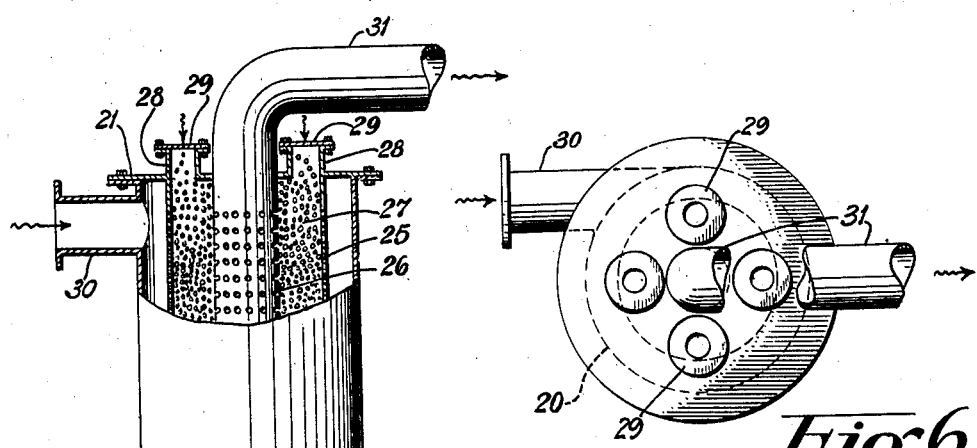
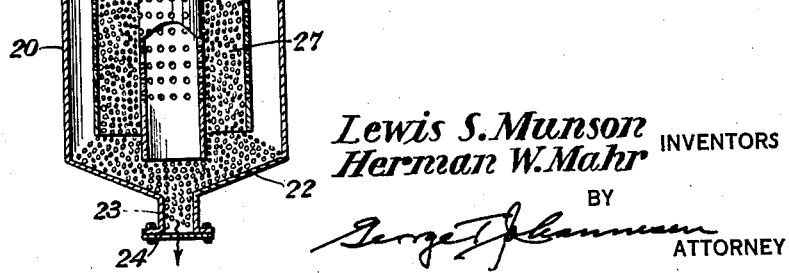
Lewis S. Munson
Herman W. Mahr   INVENTORS
BY
ATTORNEY Patented Dec. 21, 1943

2,337,060

UNITED STATES PATENT OFFICE 2,337,060

MANUFACTURE OF SULPHURIC ACID

Lewis Storms Munson, Brandywine Hundred, and Hermann William Mahr, Christiana Hundred, Del., assignors to E. I. du Pont de Nemours & Company, Wilmington, Del., a corporation of Delaware Application April 24, 1940, Serial No. 331,324

6 Claims. (Cl. 23—175)

This invention relates to the manufacture of sulphuric acid from raw sulphur in contact systems of the type in which the burner gas is passed directly to a platinum type converter without intervening wet purification and has for its object the provision of processes in which the efficiency of the platinum type converter is not impaired by impurities in the burner gas notwithstanding the lack of wet purification of the burner gas which is broadly accomplished by suitable pretreatment of the raw sulphur and the air utilized for combustion of the sulphur designed particularly to maintain the chlorine, moisture and dust contents of the burner gas such that loss of conversion efficiency is avoided.

Effort has been directed heretofore to the production of sulphuric acid in abbreviated contact systems. By abbreviated contact systems we refer to systems as described above of the type in which the burner gas is passed directly to a converter without intervening wet purification, it being understood, of course, that we do not mean to exclude such operations as dry filtering the burner gas to remove dust and like impurities but rather intend to exclude such purification as scrubbing the burner gas by contact with a scrubbing liquid and like operations characteristic of various known wet purification processes. The various abbreviated contact systems heretofore proposed, however, have lacked much that is desirable with respect to efficiency. For example, it has been proposed to use vanadium type converters in view of their known insensitivity to catalytic poisoning. In such processes using vanadium catalysts, however, it is not possible to employ a burner gas containing much more than 8.0 per cent sulphur dioxide and obtain satisfactory conversion efficiencies.

It has also been proposed to use platinum type converters in abbreviated contact systems, but on the whole the amount of impurities introduced into the burner gases is so great as to preclude efficient converter operation. It has been suggested that by the proper selection of raw sulphur, for example, by the use of Louisiana, Texas, or Freeport brimstone a burner gas may be passed directly without wet purification to a platinum type converter without resulting in poisoning of the catalyst. Several factors, however, make such processes undesirable. In the first place, the amount of impurities in raw sulphur is not always uniform so that at times the conversion efficiency tends to fluctuate as the impurities in the sulphur are larger or smaller. Quite independent of the more or less slight variations which may be expected in the sulphur at its source impurities are occasionally introduced as a result of transportation. For example, exposure to salt water during transportation frequently materially augments the chloride content of the raw sulphur and causes lowered conversion efficiency and non-uniform operation.

In the second place, the amount of chlorine in the burner gas tends to build up to excessive concentrations in the operation of such process, since without wet purification no means is provided for purging the system of chlorine. All the chlorine introduced by way of the raw sulphur passes on into the absorption system where much, and in some cases practically all, is retained in the sulphuric acid produced. This is particularly true in systems producing fuming sulphuric acid or oleum. When the acid so contaminated with chlorine is recycled for drying the air used for combustion of the sulphur, chlorine is reintroduced into the system and gradually builds up to deleterious amounts. These and other factors make the processes heretofore available for operation of abbreviated contact systems with platinum type converters undesirable.

We have now discovered new and useful processes whereby platinum type converters may be effectively employed in abbreviated contact systems without the disadvantages hereinbefore pointed out. The new processes according to our invention are characterized by pretreatment of the raw sulphur and the air utilized for combustion of the sulphur in a manner such that the burner gas has a substantially uniform constituency and a chlorine and moisture content such that it may be passed directly without wet purification to a platinum type converter without resulting in poisoning of the catalyst. We have found that by pre-drying the air with a chlorine-free sulphuric acid to a moisture content of less than about 2.5 mgs. per cubic foot and by pretreating the sulphur to reduce the chlorine content to less than 0.003 per cent calculated as chlorine, the burner gas may be passed directly without wet purification to a platinum type converter without loss of conversion efficiency due to poisoning of the catalyst.

Figure 2:
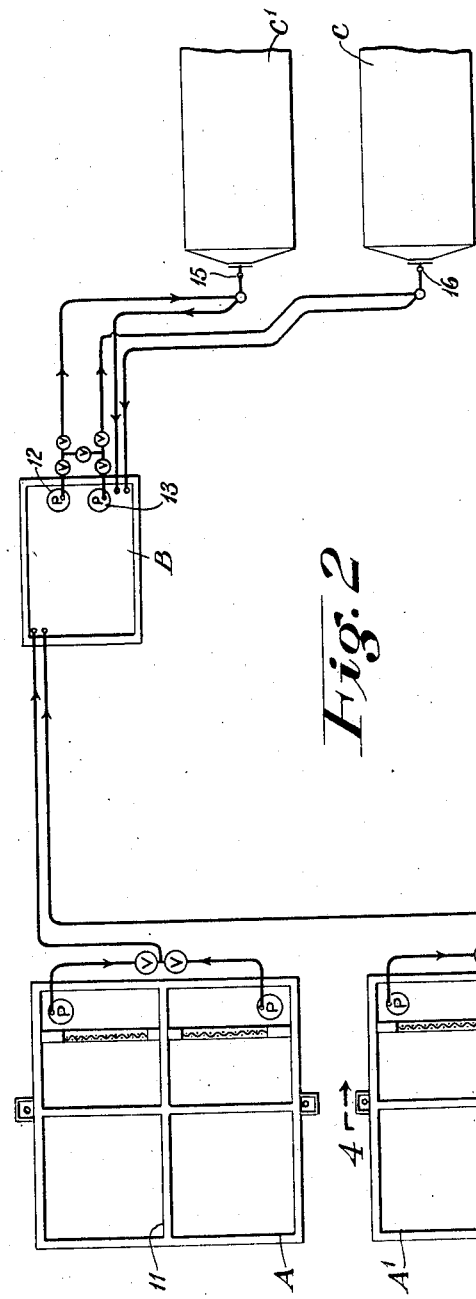
Figure 3:
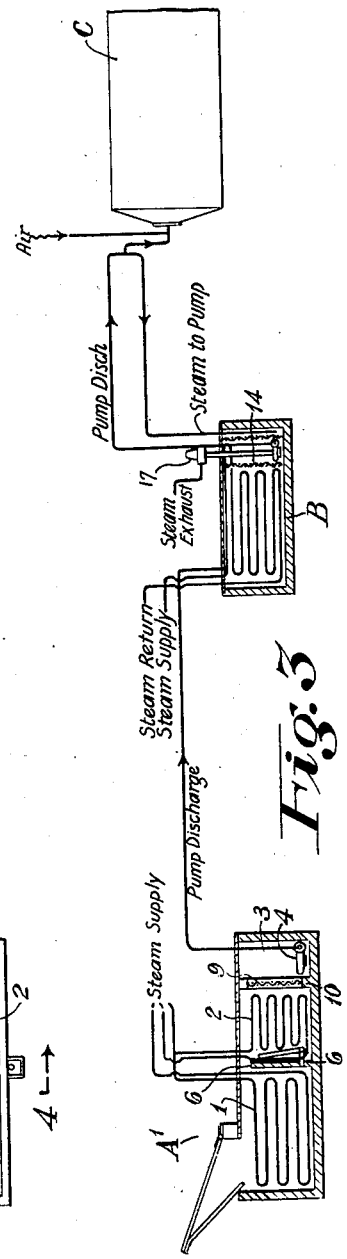

The new processes according to our invention are fully illustrated in the accompanying drawings in which Figure 1 is a flow sheet illustrating the processes of our invention. Figure 2 is a plan view showing sulphur melting and settling pits, molten sulphur storage pits and combustion chambers. Figure 3 is a section in elevation of the pits shown in Figure 2. Figure 4 is a section of the sulphur melting and settling pits taken along lines 4—4, Figure 2. Figure 5 is an elevation in section of a dust filter and Figure 6 is a plan view of Figure 5.

We have found that burner gas obtainable from the direct combustion of raw sulphur such as Louisiana, Texas, or Freeport brimstone is not suitable for abbreviated contact systems employing a platinum type converter. Such processes as have been heretofore proposed have taken to account only those poisons, like arsenic, which have a permanent poisoning effect and have failed to take in account temporary poisons like chlorine. We have found that these latter type poisons lead to inconstancy of conversion efficiency and are all the more insidious in that the reduction in conversion efficiency resulting therefrom may go unnoticed by reason of the temporary nature of the poisoning. Moreover, we have found that under certain conditions of operation chlorine tends to build up in the system and for all intents and purposes has the same deleterious effect as a permanent poison.

With the object of avoiding these disadvantages we provide processes whereby the chlorine content of the burner gases is maintained substantially constant, and less than would deleteriously affect the conversion efficiency in a platinum type converter, against variations in the chlorine content of the raw sulphur and accumulation of chlorine in the system during operation. We accomplish these results by treating the raw sulphur to reduce its chlorine content to less than about 0.003 per cent calculated as chlorine and by pre-drying the air used for combustion of the sulphur to less than 2.5 mgs. moisture per cubic foot. By pretreating the sulphur we insure that the chlorine content of the burner gas shall remain relatively constant and less than would deleteriously affect the operation of a platinum type converter. Pre-drying the air not only serves its customary function of preventing precipitation or formation of sulphuric acid in the burner gas but also tends to minimize the poisoning effect of chlorine. In a burner gas containing more than 2.5 mgs. water vapor per cubic foot, distribution of chlorine tends to become non-uniform so that even with a chlorine content less than would normally be deleterious in a dry burner gas poisoning may result. We have found that a proper balance between the chlorine and water vapor obtains when the raw sulphur is treated to reduce the chlorine content to less than about 0.003 per cent calculated as chlorine and the air is dried to less than about 2.5 mgs. moisture per cubic foot.

In carrying out the processes of our invention first consideration need be paid to the source of the chlorine contamination. This may be attributed principally to the presence of chlorides, principally sodium chloride, in the raw sulphur. We have found that this impurity can be removed from the raw sulphur in a molten state by decantation. We accordingly first melt the sulphur and then maintain it molten and quiescent for a time sufficient to allow the sodium chloride to settle out, and then withdraw the relatively pure upper portion to the sulphur burner. By allowing the molten sulphur to stand in a quiescent state for a sufficient time, that is to say, at least about sixteen hours and preferably about twenty-four hours, solid impurities such as sodium chloride will settle out in the bottom of the settling pit as a fine sludge and the supernatant sulphur may be withdrawn in a relatively pure form. Moreover, when the molten sulphur is allowed so to settle the ash content of the sulphur is reduced to a minimum. We are able, for example, so to reduce the ash that dust may be effectively removed from the burner gases with dry packed filters without excessive pressure drop such as would require inordinately large blower capacity.

Suitable apparatus for treating raw sulphur is illustrated in Figures 2, 3, and 4 wherein sulphur melting and settling pits are shown at A and $A^1$ and a sulphur storage pit is shown at B. The melting and settling pits A consist of a melting compartment 1, a settling compartment 2, and a pump compartment 3. Suitable steam coils are provided for melting the sulphur and maintaining it in the molten state. Raw sulphur is charged into the melting compartment and after it is fully melted, which may require several hours, depending upon the size of the charge, the molten sulphur is transferred to the settling compartment where it is allowed to settle for sixteen hours or more, preferably about twenty-four hours. The molten sulphur is then transferred to the storage pit B by means of the pump 4 for delivery to the sulphur burners C and $C^1$. Transfer of molten sulphur from the melting compartment to the settling compartment is effected by means of an L-shaped swing pipe 5 journaled in the dividing wall 6. The swing pipe is suitably counterbalanced as illustrated in Figure 4 so that the discharge end 8 may be positioned at any desired level in the settling compartment.

The settling compartment is separated from the pump compartment by means of a removable screen 9 to hold back any large particles of foreign matter. A four to eight mesh screen reinforced by a backing of 1½ inch mesh screen is suitable for this purpose. The screen 9 preferably terminates short of the bottom of the pit and rests on the partitioned wall 10, which forms a barrier against movement of fine sludge accumulating in the settling compartment into the pump compartment.

The pump 4 is of conventional design and any submerged centrifugal pump suitable for handling molten sulphur will be found suitable. The intake port is preferably located well above the bottom of the compartment and may suitably be at a level corresponding to the partition 10. It should be so located and so operated as not substantially to disturb the quiescence of the molten sulphur in the settling compartment. We have found it desirable to operate the pump in intermittent manner, say about 20 per cent of the time or as often as required to maintain the storage pit B well filled with molten sulphur. We also find it desirable to discontinue pumping entirely after about two-thirds of the molten sulphur has been transferred to the storage pit.

In view of the time required for melting and settling the sulphur and in order to keep the storage pit well filled at all times we find it desirable to employ several melting and settling pits feeding into a single storage pit. Thus, a longitudinal partition 11 is provided which divides each of the melting and settling pits A and $A^1$ in two thereby providing in all four units feeding the single storage unit B. In this manner the storage unit B can be well filled at all times and yet ample time provided for melting and settling the sulphur and cleaning the melting and settling pits.

The sulphur storage pit B is provided with two pumps 12 and 13 similar in design to pump 4 each enclosed in an 8-mesh basket type screen 14. These pumps serve to deliver a continuous stream of molten sulphur to each of the atomizing jets 15 and 16 of the sulphur burning units C and may be equipped with a variable speed drive for regulating the sulphur feed. The steam turbines 17 are utilized for this purpose. The storage pit should be maintained well filled with sulphur to avoid disturbing any sludge which may settle out in the bottom of the pit.

In carrying out the processes of our invention we find it expedient to operate the melting and settling pits on a 48-hour cycle involving melting, settling, and pumping to the storage pit. Except during the initial charging the melting compartment will be approximately one-third full when charging starts. This operates advantageously to expedite the melting of the sulphur since the molten sulphur left in the pit acts by contact with the solid sulphur to transfer heat. The charging and melting is continued until each of the three compartments are well filled. This will ordinarily take from about six to seven hours, depending, of course, upon the size of the installation. Thereafter the molten sulfur is allowed to stand for approximately twenty-four hours before being transferred to the storage pit. During this time the sulphur is maintained at a temperature of about 135 to 140° C. Thereafter the pump 4 is started and pumping continued until about two-thirds of the sulphur has been removed.

We prefer not to remove more than about two-thirds of the sulphur at any one time in order to prevent disturbing the sludge which accumulates in the bottom of the pit. For the same reasons we prefer to operate the pump intermittently. By operating the pump intermittently any disturbance which may have been created in settling compartment will be given time to subside. In the meantime another pit will have been charged so that when the pumping in the first pit is complete the sulphur in the second pit will be in condition for transfer to the storage pit.

As the melting, settling, and pumping cycle is repeated fine mineral matter, asphalt, chlorides, and similar impurities accumulate in the compartments of the melting and settling pit. When the sulphur transferred to the storage pit approaches 0.01 per cent ash or 0.003 per cent chlorine calculated as chlorine the pit is cleaned.

After the molten sulphur thus purified is transferred to the storage pit it is injected into the sulphur burners C as an atomized spray. Here it comes in contact with previously dried and preheated air at a temperature suitable for effecting the desired degree of combustion. This air comes from the blowers D through the drying tower E, then through line 18 to the coke box F, then through line 19 into heat exchangers G and H and thence through line 20 to the sulphur burner C. With the air preheated to about 265° C. the combustion is so regulated that the burner gases will contain between about 9.5 and 10 per cent sulphur dioxide by volume and a requisite amount of oxygen for converting the sulphur dioxide to sulphur trioxide. Burner gas produced in this manner will contain less than 0.400 mg. of dust per cubic foot and less than 0.010 mg. chlorine per cubic foot. In practice the chlorine content will run between about 0.001 to about 0.010 mg. per cubic foot and the dust from about 0.100 to 0.400 mg. per cubic foot.

The dust may be further reduced to a negligible amount by passing the burner gas through dry filters I and J suitably packed with granite or like refractory particles.

The No. 1 dust filter I takes most of the load and consequently must be recharged at more frequent intervals than the No. 2 dust filter J. A suitable mechanism for this purpose is illustrated in Figures 5 and 6. In this construction there is provided an outer cylindrical imperforate casing 20 which has an imperforate top plate 21 and bottom plate 22. The bottom plate is conical, sloping down to the opening 23 which is provided with a movable cover 24. Suspended from the top plate 21 are two concentric perforate cylinders 25 and 26 which terminate adjacent the bottom 22. These concentric perforate cylinders form an annular chamber 27 which is charged with cracked granite or other suitable refractory filter medium. Openings 28 with removable covers 29 are provided in the top plate 21 communicating with the annular chamber 24. The outside casing 20 is provided with an inlet port 30 which is located at the top of casing 20 and opposite the beginning of the perforations in plate 25. The inlet pipe 30 is arranged tangentially to the casing 20 whereby the gases entering are caused to whirl about the annular chamber 27. The top plate 21 is provided with the gas exit 31 which communicates with the interior of perforate cylinder 26. Thus the gases entering the inlet port 30 swirl about an annular column of refractory material, filter therethrough and pass out through exit 31. When the filter medium becomes charged, or continuously or intermittently during operation thereof, the spent filter medium is withdrawn from the port 23 and fresh filter medium is charged through the port 28. Since the gases are fed in through port 30 adjacent the beginning of perforations, most of the filtering is done in the fresh charge of filter medium.

While the air used in burning the sulphur may be predried in any suitable manner, we have found it desirable, as already pointed out, to take certain precautions to prevent introduction of chlorine into the burner gas from this source. In systems where substantially all the sulphur trioxide is recovered as fuming sulphuric acid or oleum, substantially all of the chlorine introduced into the system is retained in the oleum absorbers. We have found that, when an acid of this character is employed in drying the gas, chlorine is reintroduced into the system and due to recycling tends to build up in the system.

In order to prevent recycling and build up of chlorine we treat the absorber acid to remove chlorine before using it in drying the air. As shown in the flow sheet of Figure 1, in which flow of liquid is indicated by single lines and flow of gas by double lines, fuming sulphuric acid is withdrawn from the absorber units K through line 32 into the purification tank 33. Here the fuming sulphuric acid is diluted to about 98 per cent strength, using spent drying tower acid which is fed into the acid purification tank 33 through line 34. Water may be used for this purpose, but usually the supply of spent drying tower acid is more than sufficient and the surplus is sent back through line 35 to the absorption units. Air from the blower unit L is passed through line 36 into the acid purification tank 33 and the effluent containing the chlorine is vented to the atmosphere. The purified acid is then transferred through line 37 to the drying tower circulating system which includes the circulating tank 38 and the cooling unit 39. Acid from the circulating tank 38 passes up through line 40 and line 41 into the drying tower E where it is permitted to flow down through packing of the usual type, thereby intimately to scrub the air and to free it of moisture. The effluent acid from the drying tower passes through line 42 into the cooling coil 39 and then through line 43 into the circulating tank 38. The drying tower acid is recycled over the drying tower as long as satisfactory drying of the air is obtained. The spent drying tower acid is then withdrawn through line 44 for use as described and the circulating tank is recharged. Continuous operation is obtained by using two circulating tanks.

The strength of the drying tower acid should not be allowed to fall below such a value as will dry the air to less than about 2.5 mgs. moisture per cubic foot. Preferably the strength of the drying tower acid is maintained at such a value as will produce air having a moisture content of about 1.5 mgs. per cubic foot. Ordinarily an acid strength ranging from about 92 to 98 per cent will be found adequate, altho in some seasons when the moisture content of the ambient air is especially high it may be desirable not to go below about 94 per cent. It will be apparent, of course, that suitable variation may be made in the acid strength given so long as the principles outlined are intelligently applied. For example, it is of no great moment whether the fuming sulphuric acid be diluted 98 per cent or some strength near this figure, the only criteria being that the acid, when blown, shall contain sufficient free water to decompose the chloro-sulphonic acid. While any acid of a strength of less than 100 per cent which will satisfactorily dry the air may be employed, it is of advantage to maintain the acid as strong as possible without introducing a too critical control factor. A 98 per cent acid will be found most practical for plant practices and a stronger acid may not contain sufficient water fully to free the chlorine. It will be obvious that the more dilute this acid is made the more inefficient the drying operation becomes, and that the lower limit will be determined for any particular system when the acid is no longer capable of drying the air to less than 2.5 mgs. moisture per cubic foot.

The problem of removing chlorine from absorber acid prior to its use in drying the air is not confined necessarily to fuming sulphuric acid. Even in systems where the drying tower acid is obtained directly from 98 per cent absorbers sufficient chlorine may be present in the acid deleteriously to effect the operation of the system. While it has been generally supposed that acid obtained directly from 98 per cent absorbers is substantially free of chlorine contamination, we have found that for some inexplicable reason the absorber acid, which normally runs free of chlorine, will on occasion show considerable amounts of chlorine and sufficient, if introduced into the burner gas by way of the drying tower acid, deleteriously to effect the operation of a platinum type converter. It will be apparent accordingly that the processes of our invention are also applicable to systems in which the major portion of the sulphur dioxide is recovered as 98 per cent sulphuric acid, and that the same advantages will be obtained by blowing this acid with air prior to its use in the drying tower.

Thus it may be seen that by pretreating the sulphur and air, as fully described above, we are able to produce a burner gas of substantially uniform and constant constituency independently of variation in the nature and quality of the raw sulphur and in which temporary or permanent lowering of the conversion efficiency of the platinum type converters due to chloride poisoning, whether due to the chlorine introduced into the burner gas by way of the raw sulphur or to that accumulating in the system as a result of recycling absorber acid, is avoided. Moreover, by pretreating the sulphur as described we avoid an equally important disadvantage of the prior art processes in that simultaneously with the separation of chlorides we also effect a separation of ash-producing impurities. We consider this an important feature of our invention since the amount of dust introduced into the burner gas by the direct combustion of raw sulphur as in the prior art processes presents a serious problem without wet purification. If allowed to pass on into the converters the catalytic mass rapidly becomes covered and clogged with dust causing a reduction in conversion efficiency and a substantial increase in the pressure drop across the converter. If dry filters are used these too rapidly become clogged with dust and require frequent repacking. Moreover, larger filter capacity, causing a larger pressure drop in the system and consequently requiring larger blower capacity, is required. Thus it may be seen that our novel processes provide numerous advantages over the prior art processes and admit of continuous production of sulphuric acid with a maximum of conversion efficiency throughout and a minimum of interruptions.

While we have specifically described our invention it will be evident that many apparently widely differing embodiments may be made without departing from the spirit and scope thereof as long as the raw sulphur is treated to reduce the chlorine to less than about 0.003 per cent calculated as chlorine and ash to less than 0.01 per cent, and the sulphur is burned in a chlorine-free air containing less than 2.5 mgs. moisture per cubic foot.

The term "chlorine" as used herein, unless otherwise plainly indicated, is intended to apply to the various forms of chlorine, whether free or combined, commonly occurring in the type of process involved.

The term "ambient" as applied to air is intended to mean the air surrounding or enveloping the contact plant and is therefore synonymous with atmospheric air.

We claim:

1. In the manufacture of sulphuric acid in contact systems employing a platinum type converter in which the burner gas is passed to the converter without intervening wet purification the method of producing a burner gas of substantially uniform constituency and a chlorine content less than would deleteriously affect the operation of the platinum type converter which comprises treating molten raw sulphur to effect separation therefrom of chlorine and ash-producing impurities to less than about 0.003 per cent chlorine and less than about 0.01 per cent ash, producing a chlorine-free sulphuric acid by blowing air through absorber acid produced in the system while at a strength sufficiently below 100 per cent to provide sufficient free water to decompose chlorosulphonic acid, drying air with the chlorine-free sulphuric acid so-produced to less than about 2.5 mgs. moisture per cubic foot, and burning the treated molten sulphur with the dried air.

2. In the manufacture of sulphuric acid in contact systems employing a platinum type converter in which the burner gas is passed to the converter without intervening wet purification, the method which comprises maintaining a body of sulphur molten and quiescent for a period such that a portion thereof contains less than about 0.003 per cent chlorine, and less than about 0.01 per cent ash, and thereafter withdrawing said molten sulphur from said portion to a sulphur burning unit without substantially disturbing the quiescence of said body; producing a chlorine-free sulphuric acid by diluting oleum absorber acid produced in the system to less than 100 per cent strength and sufficiently to provide enough free water to decompose chlorosulphonic acid and blowing air therethrough until the volatile chlorine compounds are expelled; drying air with the chlorine-free sulphuric acid so produced to less than about 2.5 mgs. water per cubic foot, burning the treated molten sulphur with the dried air, and converting the sulphur dioxide thus produced to sulphur trioxide in a platinum type converter.

3. In the manufacture of sulphuric acid in contact systems employing a platinum type converter in which the burner gas is passed to the converter without intervening wet purification, the method of producing a burner gas of substantially uniform constituency and a chlorine content less than would deleteriously affect the operation of the platinum type converter which comprises treating molten raw sulphur to effect separation therefrom of chlorides and ash-producing impurities, producing a chlorine-free sulphuric acid by diluting oleum absorber acid produced in the system to less than 100 per cent strength and sufficient to provide enough free water to decompose chlorosulphonic acid, and blowing air therethrough until the volatile chlorine compounds are expelled; drying air with the chlorine-free sulphuric acid so produced, burning the treated molten sulphur with the dry air so produced, and converting the sulphur dioxide thus produced to sulphur trioxide in a platinum type converter.

4. In the manufacture of sulphuric acid in contact systems employing a platinum type converter in which a sulphur dioxide-containing gas obtained by burning sulphur is passed from the burner to the converter without intervening wet purification, the method which comprises producing a sulphur dioxide-containing gas of substantially uniform constituency and containing chlorine but in amount less than would deleteriously affect operation of the platinum type converter by burning sulphur containing less than about 0.003 per cent chlorine in air containing less than 2.5 milligrams moisture per cubic foot, passing the burner gas through a platinum type converter to convert the sulphur dioxide to sulphur trioxide, absorbing the sulphur trioxide as an acid of at least 98 per cent strength whereby at least a portion of the chlorine in the burner gas remains in the acid as chlorosulphonic acid, withdrawing a portion of the acid thus produced, diluting it to a drying acid strength between about 98 per cent and that required for drying atmospheric air to less than 2.5 milligrams moisture per cubic foot, blowing air through the diluted acid to remove volatile chlorine compounds, thereafter drying air with the acid thus treated and utilizing the dried air to burn the sulphur.

5. In the manufacture of sulphuric acid in contact systems employing a platinum type converter in which the burner gas is passed to the converter without intervening wet purification the method of producing a burner gas of substantially uniform constituency and a chlorine content less than would deleteriously affect the operation of the platinum type converter which comprises treating molten raw sulphur to effect separation therefrom of chlorine and ash-producing impurities, said separation being incomplete so that the absorber acid produced in the system contains chlorine compounds, producing a chlorine-free sulphuric acid by blowing air through absorber acid produced in the system, said acid containing sufficient free water to decompose chlorosulphonic acid, drying air with the chlorine-free sulphuric acid so produced, and burning the treated molten sulphur with the dried air.

6. In the manufacture of sulphuric acid in contact systems employing a platinum type converter in which the burner gas is passed to the converter without intervening wet purification and in which sulphuric acid made in the process is utilized for pre-drying the air used in producing the burner gas, the method which comprises treating molten raw sulphur to effect separation therefrom of chlorine compounds and ash-producing impurities, said separation being incomplete so that the acid produced in the system contains chlorine compounds, treating acid produced in the process to remove chlorine compounds therefrom, drying air with the acid thus purified and burning the treated molten sulphur with the air thus dried.

LEWIS S. MUNSON.
HERMANN W. MAHR.